US010527167B2

(12) United States Patent
Hwang

(10) Patent No.: US 10,527,167 B2
(45) Date of Patent: Jan. 7, 2020

(54) METHOD FOR CONTROLLING PULLEY OF VEHICLE HAVING CONTINUOUSLY VARIABLE TRANSMISSION

(71) Applicants: Hyundai Motor Company, Seoul (KR); Kia Motors Corp., Seoul (KR)

(72) Inventor: Jin Young Hwang, Yongin-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 16/132,749

(22) Filed: Sep. 17, 2018

(65) Prior Publication Data

US 2019/0293176 A1    Sep. 26, 2019

(30) Foreign Application Priority Data

Mar. 23, 2018   (KR) .......................... 10-2018-0033661

(51) Int. Cl.
   *F16H 9/12*     (2006.01)
   *F16H 61/662*   (2006.01)
   *F16H 59/72*    (2006.01)
   *F16H 55/36*    (2006.01)

(52) U.S. Cl.
   CPC ....... *F16H 61/66272* (2013.01); *F16H 9/125* (2013.01); *F16H 55/36* (2013.01); *F16H 59/72* (2013.01); *F16H 2061/66218* (2013.01); *F16H 2061/66295* (2013.01)

(58) Field of Classification Search
   CPC .... F16H 61/66272; F16H 55/36; F16H 9/125; F16H 59/72; F16H 2061/66295
   See application file for complete search history.

(56) References Cited

U.S. PATENT DOCUMENTS

| 2015/0080156 | A1* | 3/2015 | Takahashi | ......... F16H 61/66259 |
| | | | | 474/11 |
| 2015/0148157 | A1* | 5/2015 | Takahashi | ............... F16H 59/20 |
| | | | | 474/23 |
| 2016/0363219 | A1* | 12/2016 | Sasaki | ..................... F16H 59/66 |
| 2017/0002924 | A1* | 1/2017 | Honma | .................. F16H 61/662 |
| 2017/0114895 | A1* | 4/2017 | Hattori | ............. F16H 61/66259 |
| 2018/0080553 | A1* | 3/2018 | Iwasa | ........................ B60L 7/14 |

FOREIGN PATENT DOCUMENTS

| KR | 10-2011-0125395 A | 11/2011 |
| KR | 10-1293958 B1 | 8/2013 |
| KR | 10-1438614 B1 | 9/2014 |
| KR | 10-1448769 B1 | 10/2014 |
| KR | 10-1756553 B1 | 7/2017 |

* cited by examiner

*Primary Examiner* — David J Hlavka
(74) *Attorney, Agent, or Firm* — Morgan, Lewis & Bockius LLP

(57) ABSTRACT

A method for controlling a pulley of a vehicle having a continuously variable transmission may include: determining, by a controller, a pulley target torque and a target pulley ratio, upon detecting disturbance of the vehicle; determining, by the controller, target pressures of a driving pulley and a driven pulley based on the pulley target torque and the target pulley ratio and comparing the target pressures with each other; and controlling, by the controller, a pressure of a pulley having a larger target pressure in the comparing to be a maximum pressure generatable depending on a traveling situation of the vehicle and controlling a pressure of the other pulley to be increased to a correction pressure for implementing the target pulley ratio.

10 Claims, 3 Drawing Sheets

METHOD FOR CONTROLLING PULLEY OF VEHICLE HAVING CONTINUOUSLY VARIABLE TRANSMISSION

CROSS REFERENCE TO RELATED APPLICATION

The present application claims priority to Korean Patent Application No. 10-2018-0033661, filed Mar. 23, 2018, the entire contents of which is incorporated herein for all purposes by this reference.

BACKGROUND OF THE INVENTION

Field of the Invention

The present invention relates to a method for controlling a pulley of a vehicle having a continuously variable transmission configured for preventing occurrence of belt slip while maintaining a pulley ratio when impact is transferred to the vehicle while the vehicle traveling on a rough road.

Description of Related Art

A continuously variable transmission includes a driving pulley, a driven pulley, and a belt, and means a device continuously varying a gear ratio through a change in diameters of contact surfaces between the belt and the respective pulleys by controlling oil pressures supplied to the respective pulleys to move the pulleys in an axial direction thereof.

Therefore, a speed change stage may be configured in a continuously variable manner, such that the speed change stage may be optimized at a point at which engine efficiency is higher as compared with a multi-stage transmission, resulting in improvement of fuel efficiency and performance of a vehicle.

However, since a belt type continuously variable transmission performs a speed change using the belt, when disturbance such as a rapid torque variation, entry into a rough road, or the like, occurs, the belt is slipped with respect to the pulleys to overload and damage the transmission.

Conventionally, to solve such a problem, when impact occurs in the vehicle, pressures of the pulleys are simply controlled to be increased to a predetermined reference value to prevent a belt slip phenomenon.

However, since maximum pressures to which the pressures of the driving pulley and the driven pulley may be controlled to be increased are lowered when a revolution per minute (RPM) of an engine of the vehicle is low and the disturbance is large, a pressure control of the driving pulley and the driven pulley is limited, such that a pulley ratio may not be implemented.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for controlling a pulley of a vehicle having a continuously variable transmission configured for accurately implementing a required gear ratio while preventing occurrence of belt slip by controlling a pressure of any one of a driving pulley and a driven pulley to be maximum depending on a pulley target torque and a target pulley ratio and controlling a pressure of the other of the driving pulley and the driven pulley to be appropriate for the target pulley ratio when disturbance occurs in the vehicle.

According to an exemplary embodiment of the present invention, a method for controlling a pulley of a vehicle having a continuously variable transmission may include: determining, by a controller, a pulley target torque and a target pulley ratio, upon detecting disturbance of the vehicle; determining, by the controller, target pressures of a driving pulley and a driven pulley based on the pulley target torque and the target pulley ratio and comparing the target pressures with each other; and controlling, by the controller, a pressure of a pulley having a larger target pressure between the driving pulley and the driven pulley in the comparing to be a maximum pressure generatable depending on a traveling situation of the vehicle and controlling a pressure of the other pulley between the driving pulley and the driven pulley to be increased to a correction pressure for implementing the target pulley ratio.

When the target pressure of the driving pulley is higher than that of the driven pulley, the controller may be configured to control a pressure of the driving pulley to be the maximum pressure generatable depending on the traveling situation of the vehicle, and control a pressure of the driven pulley to be the correction pressure corresponding to a value obtained by dividing the maximum pressure by the target pulley ratio, in the controlling.

When the target pressure of the driven pulley is higher than that of the driving pulley, the controller may be configured to control a pressure of the driven pulley to be the maximum pressure generatable depending on the traveling situation of the vehicle, and control a pressure of the driving pulley to be the correction pressure corresponding to a value obtained by multiplying the maximum pressure by the target pulley ratio, in the controlling.

In the controlling, the controller may be configured to determine the maximum pressure generatable depending on the traveling situation of the vehicle as a value mapped depending on a revolution per minute (RPM) of an engine and an oil temperature.

In the determining, the controller may be configured to determine the pulley target torque by adding an additional torque determined through a wheel slip amount to a pulley input torque, and determine the target pulley ratio based on a vehicle speed and an accelerator pedal stepping amount.

The controller may detect that the disturbance occurs when a wheel acceleration is out of a set acceleration region.

The method for controlling a pulley of a vehicle having a continuously variable transmission may further include, after the controlling: confirming, by the controller, whether or not the disturbance of the vehicle is released; and controlling, by the controller, pressures of the driving pulley and the driven pulley to be decreased to a predetermined pressure change ratio when the disturbance of the vehicle is released.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
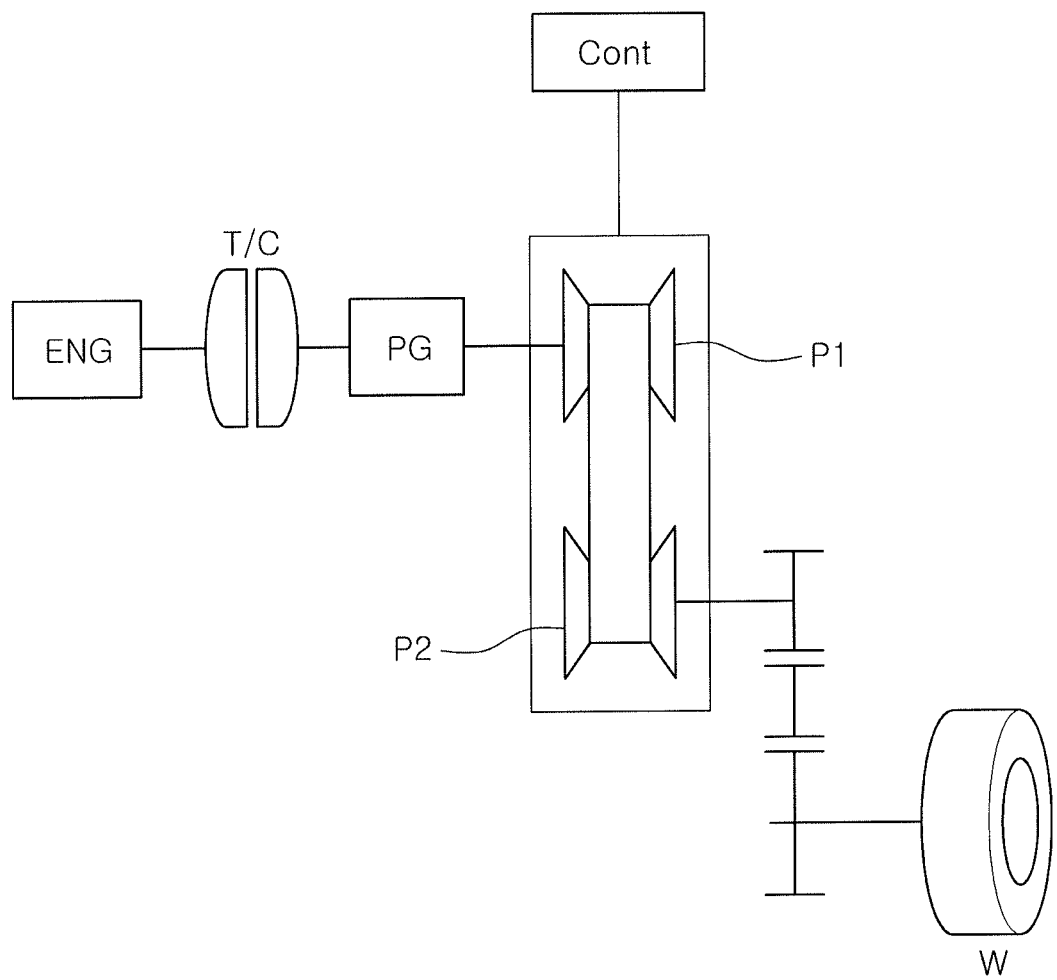
FIG. 1 is a schematic view illustrating a structure of a vehicle having a continuously variable transmission according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, a method for controlling a pulley of a vehicle having a continuously variable transmission according to an exemplary embodiment of the present invention will be described with reference to the accompanying drawings.

Figure 2:
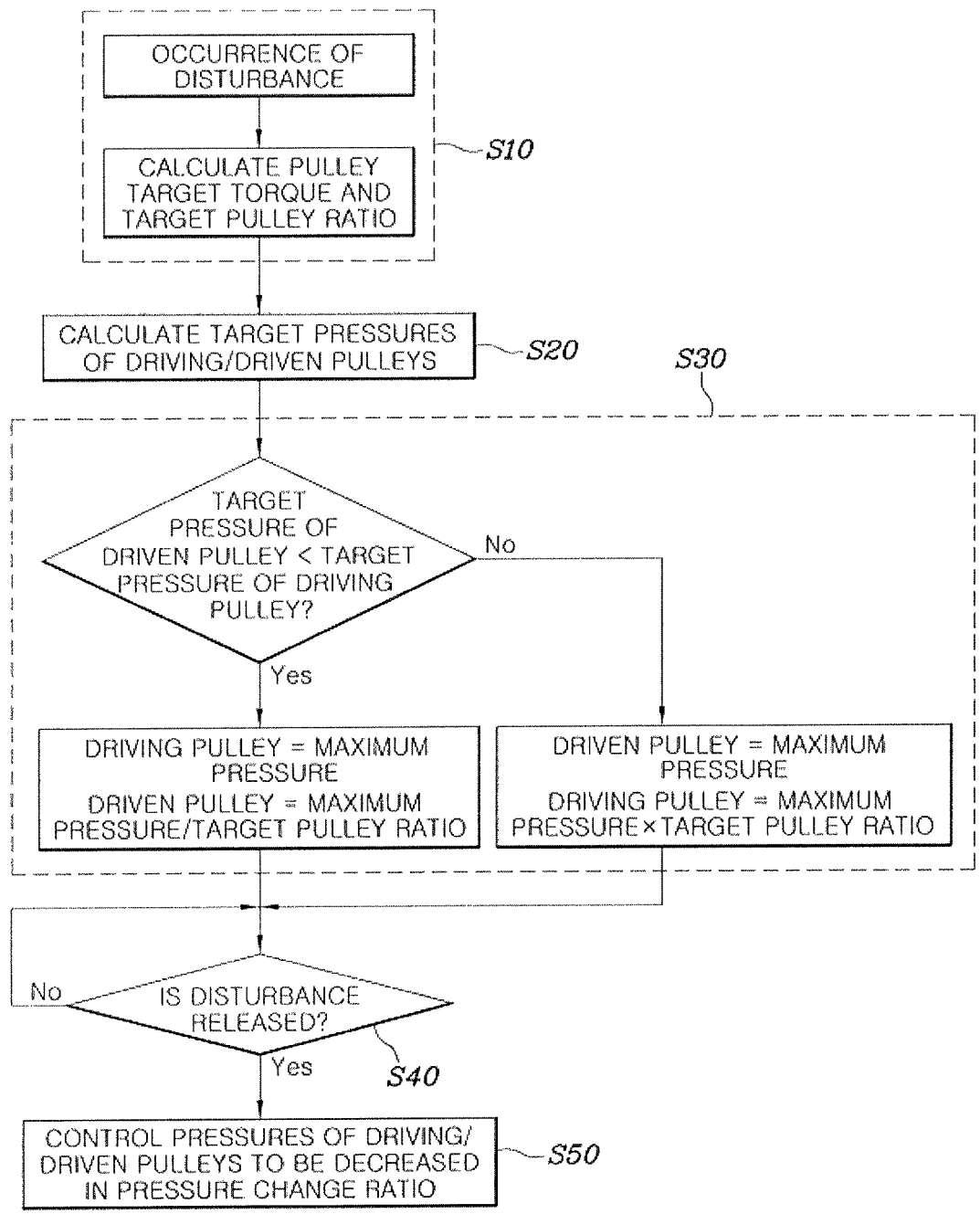
FIG. 2 is a flow chart illustrating a method for controlling a pulley of a vehicle having a continuously variable transmission according to an exemplary embodiment of the present invention.

FIG. 1 is a schematic view illustrating a structure of a vehicle having a continuously variable transmission according to an exemplary embodiment of the present invention, and FIG. 2 is a flow chart illustrating a method for controlling a pulley of a vehicle having a continuously variable transmission according to an exemplary embodiment of the present invention.

Referring to FIG. 1 and FIG. 2, the method for controlling a pulley of a vehicle having a continuously variable transmission according to an exemplary embodiment of the present invention may include: determining, by a controller Cont, a pulley target torque and a target pulley ratio, upon detecting disturbance of the vehicle (S10); determining, by the controller Cont, target pressures of a driving pulley P1 and a driven pulley P2 based on the pulley target torque and the target pulley ratio and comparing the target pressures with each other (S20); and controlling, by the controller Cont, a pressure of a pulley having a larger target pressure in the comparing (S20) to be a maximum pressure which may be generated depending on a traveling situation of the vehicle and controlling a pressure of the other pulley to be increased to a correction pressure for implementing the target pulley ratio (S30).

As illustrated in FIG. 1, the vehicle having a continuously variable transmission is configured to sequentially transfer power of an engine ENG to a torque converter E/C, a planetary gear PG, a driving pulley P1, a driven pulley P2, a reduction gear, a driving wheel W. Here, the driving pulley P1 and the driven pulley P2 are connected to each other by a belt, and a gear ratio in which the power of the engine ENG is transferred to the driving wheel W is continuously changed while contact areas between the belt and the pulleys being changed depending on oil pressures supplied to the respective pulleys. Therefore, the gear ratio of the vehicle may be implemented in a continuously variable manner.

The driving pulley P1 and the driven pulley P2 are provided with hydraulic cylinders, respectively, and the contact areas between the belt and the pulleys are changed while widths of the pulleys becoming narrow or wide depending on oil pressures acting on the hydraulic cylinders, such that the gear ratio of the vehicle is adjusted. Here, the gear ratio is adjusted by the pulleys, and may also be called a pulley ratio.

The controller Cont is configured to control pressures applied to the driving pulley P1 and the driven pulley P2 depending on a traveling state of the vehicle. In an exemplary embodiment of the present invention, the controller Cont is provided to perform a control logic for preventing occurrence of a burn-out phenomenon due to separation of the belt from the pulleys when the disturbance is applied to the vehicle.

As illustrated in FIG. 2, the controller Cont primarily detects whether or not the disturbance occurs in the vehicle, and determines the pulley target torque and the target pulley ratio of the vehicle, upon detecting the disturbance (S10). A specific method in which the controller Cont determines the pulley target torque and the target pulley ratio will be described below.

As such, the controller Cont determines the target pressure of the driving pulley P1 and the target pressure of the driven pulley P2 based on the determined pulley target torque and target pulley ratio, and then compares the target pressures with each other (S20).

The controller Cont controls a pressure of the pulley having the larger target pressure in the comparing (S20) to be increased to the maximum pressure corresponding to the largest pressure which may be generated depending on a current traveling situation of the vehicle, and controls a pressure of the other pulley to be increased to the correction pressure for implementing the target pulley ratio (S30).

Therefore, the controller Cont controls the pressures of the driving pulley and the driven pulley to be increased as large as possible up to a level that does not hinder drivability while accurately implementing the target pulley ratio required by the vehicle, improving reliability in controlling the pulley ratio of the continuously variable transmission and preventing occurrence of a phenomenon that the belt of the continuously variable transmission is separated from the pulleys to be worn or damaged.

Here, the maximum pressure which may be generated depending on the traveling situation of the vehicle means a maximum limit pressure that hardware components may be applied to each of the driving pulley and the driven pulley in a current state of the vehicle. A detailed description thereof will also be provided below.

In an exemplary embodiment of the present invention, when the target pressure of the driving pulley P1 is higher than that of the driven pulley P2, the controller Cont controls the pressure of the driving pulley P1 to be the maximum pressure which may be generated depending on the traveling situation of the vehicle, and controls the pressure of the driven pulley P2 to be the correction pressure corresponding to a value obtained by dividing the maximum pressure by the target pulley ratio, in the controlling (S30).

That is, when it is confirmed that the target pressure of the driving pulley P1 is greater than that of the driven pulley P2 through the comparing (S20), the controller Cont controls the pressure of the driven pulley P2 to be the correction pressure for implementing the target pulley ratio while controlling the pressure of the driving pulley P1 to be the maximum pressure.

Generally, the gear ratio is determined as a value obtained by dividing the pressure of the driving pulley P1 by the pressure of the driven pulley P2, and the correction pressure which is to be applied to the driven pulley P2 may thus be determined as a value obtained by dividing the maximum pressure of the driving pulley P1 by the target pulley ratio to implement the target pulley ratio.

Therefore, the pressure of the driving pulley P1 is secured as large as possible to prevent occurrence of a belt slip phenomenon and implement an accurate pulley ratio required by the vehicle, making it possible to improve salability of the vehicle.

To the contrary, when the target pressure of the driven pulley P2 is higher than that of the driving pulley P1, the controller Cont controls the pressure of the driven pulley to be the maximum pressure which may be generated depending on the traveling situation of the vehicle, and controls the pressure of the driving pulley to be the correction pressure corresponding to a value obtained by multiplying the maximum pressure by the target pulley ratio, in the controlling (S30).

That is, when it is confirmed that the target pressure of the driven pulley P2 is greater than that of the driving pulley P1 through the comparing (S20), the controller Cont controls the pressure of the driving pulley P1 to be the correction pressure for implementing the target pulley ratio while controlling the pressure of the driven pulley P2 to be the maximum pressure.

In the instant case, the correction pressure is determined as a value obtained by multiplying the maximum pressure of the driven pulley P2 by the target pulley ratio. Therefore, the pressure of the driven pulley P2 is secured as large as possible to prevent belt slip and implement an accurate pulley target ratio required by the vehicle, making it possible to secure salability of the vehicle.

Meanwhile, in the controlling (S30), the controller Cont may determine the maximum pressure which may be generated depending on the traveling situation of the vehicle as a value mapped depending on a revolution per minute (RPM) of the engine and an oil temperature.

The maximum pressure which may be generated depending on the traveling situation of the vehicle through the driving pulley P1 or the driven pulley P2 is determined in proportion to the RPM of the engine and the temperature of the oil. That is, as a driving amount of the engine becomes large, an oil pressure which may be supplied to the pulley is increased, and the controller Cont may thus determine the maximum pressure in proportion to the RPM of the engine.

Furthermore, as the temperature of the oil is increased, a viscosity of the oil is decreased, such that even though a large oil pressure is generated, an overload is not applied to a device at the time of supplying the oil pressure, and the controller Cont may thus determine the maximum pressure in proportion to the temperature of the oil.

Furthermore, in the determining (S10) of the present invention, the controller Cont may determine the pulley target torque by adding an additional torque determined through a wheel slip amount to a pulley input torque, and determine the target pulley ratio based on a vehicle speed and an accelerator pedal stepping amount.

The pulley input torque means a general torque applied to the wheel for traveling of the vehicle, and the additional torque means a torque converted through an impulse transferred to the wheel due to disturbance or impact caused by instability of a road surface during the traveling of the vehicle.

In an exemplary embodiment of the present invention, since the controller Cont is provided to prevent a belt from slipping due to the impact or the disturbance during a period in which the vehicle having a continuously variable transmission travels on a rough road, a low friction road, or the like, the controller Cont may determine the pulley target torque by adding the additional torque due to the disturbance to the basic pulley input torque, and determine the target pressures of the driving pulley P1 and the driven pulley P2 based on the determined pulley target torque to effectively prevent the belt slip phenomenon.

Here, the controller Cont determines the additional torque using the wheel slip amount. The wheel slip amount may be determined using a difference between a driving wheel speed and a non-driving wheel speed, and as the wheel slip amount becomes large, the controller Cont decides that an impulse transferred to the wheel is large to determine the addition torque to be large.

Meanwhile, the target pulley ratio is set to the most efficient pulley ratio according to a speed change map mapped depending on the vehicle speed and the accelerator pedal stepping amount (an accelerator position sensor APS detecting value) as in the related art.

In an exemplary embodiment of the present invention, the controller Cont may detect that the disturbance occurs when a wheel acceleration is out of a set acceleration region. That is, the controller Cont may receive wheel speed data from a speed sensor measuring a wheel speed, and determine the wheel acceleration corresponding to a change ratio of the wheel speed per hour using the received wheel speed data. Alternatively, the wheel acceleration may be directly detected using an acceleration sensor.

When the wheel acceleration is excessively large or excessively small, the controller Cont may decide that the impact is transferred to the vehicle since the present situation is a situation in which the wheel speed is rapidly changed. In an exemplary embodiment of the present invention, when the wheel acceleration exceeds or is less than a predetermined acceleration region, it is detected that the present situation is a situation in which the disturbance occurs.

Meanwhile, the method for controlling a pulley of a vehicle having a continuously variable transmission according to an exemplary embodiment of the present invention may further include, after the controlling (S30), confirming, by the controller Cont, whether or not the disturbance of the vehicle is released (S40); and controlling, the controller Cont, the pressures of the driving pulley P1 and the driven pulley P2 to be decreased to a predetermined pressure change ratio when the disturbance of the vehicle is released (S50).

That is, the controller Cont confirms whether or not the disturbance of the vehicle is released through the wheel acceleration (S40), and does not release the pressures of the driving pulley P1 and the driven pulley P2 at a time, but controls the pressures of the driving pulley P1 and the driven pulley P2 to be gradually decreased when the disturbance is released, making it possible to prevent the belt slip phenomenon due to impact caused by a rapid decrease in the pressures of the pulleys or unexpected disturbance.

Figure 3:
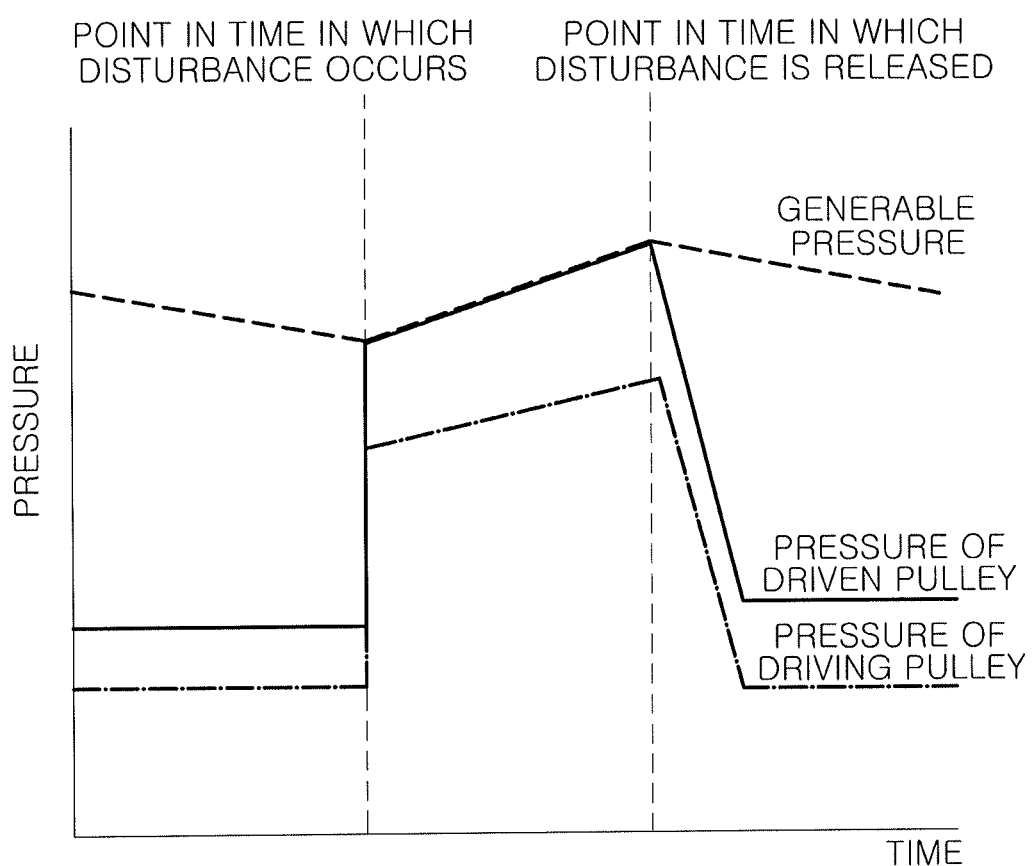
FIG. 3 is a graph illustrating changes in pressures of a driving pulley and a driven pulley according to an exemplary embodiment of the present invention.

FIG. 3 is a graph illustrating changes in pressures of a driving pulley and a driven pulley according to an exemplary embodiment of the present invention.

Referring to FIG. 3, when the target pressure of the driven pulley is higher than that of the driving pulley, at a point in time in which the disturbance occurs, the pressure of the driven pulley is controlled to be increased up to the maximum pressure which may be generated depending on the traveling situation of the vehicle, and the pressure of the driving pulley is controlled to be increased to the correction pressure configured for implementing the target pulley ratio.

When the disturbance is continued, the pressure of the driven pulley is continuously controlled to be the maximum pressure, and the pressure of the driving pulley is continuously controlled to be the correction pressure implementing the target pulley ratio.

As such, at a point in time in which the disturbance is released, the pressure of the driving pulley and the pressure of the driven pulley are controlled to be decreased to the predetermined pressure change ratio, making it possible to prevent the occurrence of the belt slip due to the impact caused to the rapid decrease in the pressures of the pulleys or additional disturbance.

According to the method for controlling a pulley of a vehicle having a continuously variable transmission having the structure as described above, when the disturbance occurs in the vehicle, it is possible to control the pressures of the pulleys to be increased as large as possible while securing a gear ratio required by the vehicle, such that a phenomenon that the belt is slipped from the pulleys or it is impossible to control the required pulley ratio may be prevented.

Furthermore, even though unexpected large impact continuously occurs, the pressures of the pulleys are secured as large as possible, making it possible to effectively prevent the occurrence of the belt slip phenomenon.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the claims appended hereto and their equivalents.

What is claimed is:

1. A method for controlling a driving pulley and a driven pulley of a vehicle having a continuously variable transmission, the method comprising:
   determining, by a controller, a pulley target torque and a target pulley ratio, upon detecting disturbance of the vehicle;
   determining, by the controller, target pressures of the driving pulley and the driven pulley based on the pulley target torque and the target pulley ratio and comparing, by the controller, the target pressures with each other; and
   controlling, by the controller, a pressure of a either one having a larger target pressure among the driving pulley and the driven pulley in the comparing to be a maximum pressure and controlling, by the controller, a pressure of another one among the driving pulley and the driven pulley to be increased to a correction pressure for implementing the target pulley ratio.

2. The method of claim 1, wherein, when the target pressure of the driving pulley is higher than the target pressure of the driven pulley, the controller is configured to control the pressure of the driving pulley to be the maximum pressure, and controls the pressure of the driven pulley to be the correction pressure corresponding to a value obtained by dividing the maximum pressure by the target pulley ratio.

3. The method of claim 1, wherein, when the target pressure of the driven pulley is higher than the target pressure of the driving pulley, the controller is configured to control the pressure of the driven pulley to be the maximum pressure, and controls the pressure of the driving pulley to be the correction pressure corresponding to a value obtained by multiplying the maximum pressure by the target pulley ratio.

4. The method of claim 1, wherein, the controller is configured to determine the maximum pressure as a value mapped depending on a revolution per minute (RPM) of an engine.

5. The method of claim 4, wherein the controller is configured to determine the maximum pressure in proportion to the RPM of the engine.

6. The method of claim 1, wherein the controller is configured to determine the maximum pressure as a value mapped depending on an oil temperature.

7. The method of claim 6, wherein the controller is configured to determine the maximum pressure in proportion to the oil temperature.

8. The method of claim 1, wherein, the controller is configured to determine the pulley target torque by adding an additional torque determined through a wheel slip amount to a pulley input torque, and determines the target pulley ratio based on a vehicle speed and an accelerator pedal stepping amount.

9. The method of claim 1, wherein the controller is configured to detect that the disturbance occurs when a wheel acceleration is beyond a set acceleration region.

10. The method of claim 1, further including, after the controlling:
   confirming, by the controller, whether the disturbance of the vehicle is released; and
   controlling, by the controller, pressures of the driving pulley and the driven pulley to be decreased in a predetermined pressure change ratio when the disturbance of the vehicle is confirmed to be released.

* * * * *